(12) United States Patent
Larsen et al.

(10) Patent No.: US 8,106,311 B2
(45) Date of Patent: Jan. 31, 2012

(54) CABLE PATHWAY PATCH RACK WITH WATERFALL MEMBER

(75) Inventors: Lars R. Larsen, Old Lyme, CT (US); Stewart A. Levesque, Scotland, CT (US)

(73) Assignee: Ortronics, Inc., New London, CT (US)

( * ) Notice: Subject to any disclaimer, the term of this patent is extended or adjusted under 35 U.S.C. 154(b) by 321 days.

(21) Appl. No.: 12/557,834

(22) Filed: Sep. 11, 2009

(65) Prior Publication Data

US 2010/0012370 A1  Jan. 21, 2010

Related U.S. Application Data

(63) Continuation-in-part of application No. 11/810,063, filed on Jun. 4, 2007, now Pat. No. 7,601,922, which is a continuation-in-part of application No. 11/490,361, filed on Jul. 20, 2006, now abandoned.

(51) Int. Cl.
*H02G 3/08* (2006.01)

(52) U.S. Cl. ......... 174/481; 174/101; 174/68.1; 174/97; 439/540.1; 211/26; 385/135

(58) Field of Classification Search .................. 174/101, 174/68.1, 97, 72 A, 481; 439/540.1, 557; 211/26; 361/826; 385/134, 135
See application file for complete search history.

(56) References Cited

U.S. PATENT DOCUMENTS

| | | | |
|---|---|---|---|
| 2,140,376 A | 12/1938 | Anderson | |
| 2,363,327 A | 11/1944 | Hodgkins et al. | |
| 2,896,009 A | 7/1959 | Caveney | |
| 3,909,505 A | 9/1975 | Taylor | |
| 4,158,754 A | 6/1979 | Yonezaki et al. | |
| 4,204,095 A | 5/1980 | DeLuca et al. | |
| 4,576,302 A | 3/1986 | Smolik | |
| 4,603,377 A | 7/1986 | Kobayashi et al. | |
| 4,641,754 A | 2/1987 | Hebel et al. | |
| 4,665,546 A | 5/1987 | Brey et al. | |
| 4,811,169 A | 3/1989 | DeLuca et al. | |
| 5,023,404 A | 6/1991 | Hudson et al. | |
| 5,153,819 A | 10/1992 | Hebel | |
| 5,188,318 A | 2/1993 | Newcomer et al. | |
| 5,574,251 A | 11/1996 | Sevier | |

(Continued)

OTHER PUBLICATIONS

U.S. Patent Office Action mailed on Oct. 19, 2006 in U.S. Appl. No. 11/490,361.

(Continued)

*Primary Examiner* — Dhiru R Patel
(74) *Attorney, Agent, or Firm* — McCarter & English, LLP

(57) ABSTRACT

A patch panel rack including a front face and an opening formed in the front face configured and dimensioned to receive and accommodate for mounting with respect to the patch panel rack at least one patch panel, further includes a waterfall member connected to the front face of the patch panel rack, the waterfall member including a horizontally extending surface positioned in front of the front face just below the opening formed therein, and at least one curved drop-off portion positioned adjacent the horizontally extending surface and sized, shaped, oriented, and configured to permit electrical cables extending vertically upward from electrical equipment disposed beneath the waterfall member to the patch panel mounted above the waterfall member to maintain a desired bend radius. The patch panel rack may be mounted to a cable management pathway substantially above a telecommunications cabinet to allow cables passing therebetween to maintain a desired bend radius.

27 Claims, 10 Drawing Sheets

U.S. PATENT DOCUMENTS

| | | | |
|---|---|---|---|
| 5,586,012 | A | 12/1996 | Lerman |
| 5,758,002 | A | 5/1998 | Walters |
| 5,765,698 | A | 6/1998 | Bullivant |
| D404,010 | S | 1/1999 | Viklund et al. |
| D404,364 | S | 1/1999 | Viklund et al. |
| 5,902,961 | A | 5/1999 | Viklund et al. |
| 5,921,402 | A | 7/1999 | Magenheimer |
| 6,102,214 | A | 8/2000 | Mendoza |
| 6,170,784 | B1 | 1/2001 | MacDonald et al. |
| 6,365,830 | B1 | 4/2002 | Snider, Jr. et al. |
| 6,365,834 | B1 | 4/2002 | Larsen et al. |
| 7,087,840 | B2 * | 8/2006 | Herring et al. ............ 174/101 |
| 7,119,282 | B2 | 10/2006 | Krietzman et al. |
| 7,173,186 | B1 | 2/2007 | Hageman |
| 7,184,644 | B2 | 2/2007 | Johnson et al. |
| 7,205,481 | B2 | 4/2007 | Higbie |
| 7,207,835 | B2 | 4/2007 | Levesque et al. |
| 7,234,674 | B2 | 6/2007 | Rippel et al. |
| 7,360,745 | B2 | 4/2008 | Nikayin et al. |
| 7,417,188 | B2 * | 8/2008 | McNutt et al. ............ 174/68.1 |
| 7,534,958 | B2 * | 5/2009 | McNutt et al. ............ 174/68.1 |
| 2007/0104450 | A1 | 5/2007 | Phung et al. |

OTHER PUBLICATIONS

Response to Office Action mailed on Jan. 16, 2007 in U.S. Appl. No. 11/490,361.
U.S. Patent Office Action mailed on Jun. 11, 2007 in U.S. Appl. No. 11/490,361.
Request For Continued Examination mailed on Oct. 10, 2007 in U.S. Appl. No. 11/490,361.
U.S. Patent Office Action mailed Dec. 28, 2007 in U.S. Appl. No. 11/490,361.
Response to Office Action mailed on Mar. 27, 2008 in U.S. Appl. No. 11/490,361.
U.S. Patent Office Action mailed on Jun. 17, 2008 in U.S. Appl. No. 11/490,361.
http://www.chatsworth.com/Product_Cocs/13395:DATASHEET. pdf (Apr. 2006).

* cited by examiner

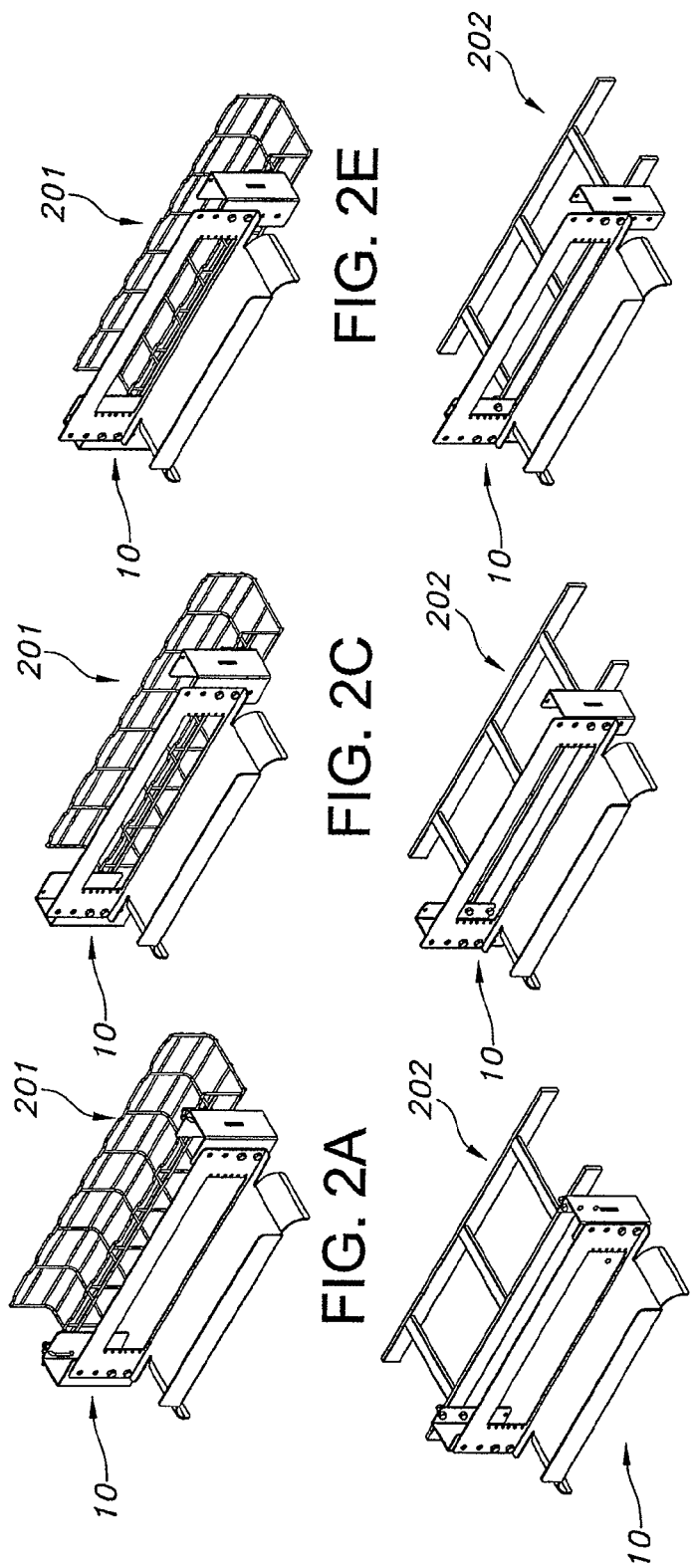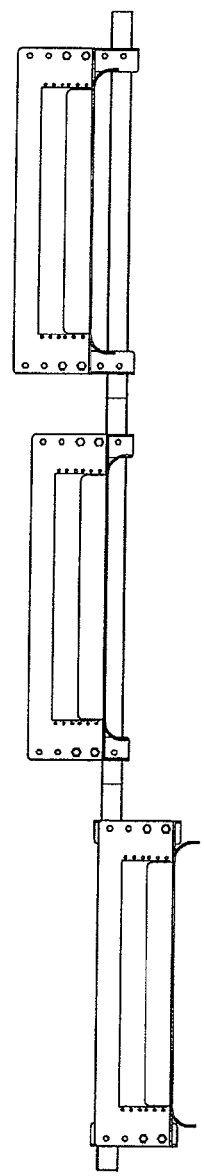

CABLE PATHWAY PATCH RACK WITH WATERFALL MEMBER

CROSS-REFERENCE TO RELATED APPLICATIONS

This application is a continuation-in-part application that claims the benefit of a non-provisional patent application: U.S. application Ser. No. 11/810,063, entitled "CABLE PATHWAY PATCH PANEL RACK WITH WATERFALL BASE," filed Jun. 4, 2007 now U.S. Pat. No. 7,601,922, which itself is a continuation-in-part application that claimed the benefit of a then non-provisional patent application: U.S. application Ser. No. 11/490,361, entitled "CABLE PATHWAY PATCH PANEL RACK," filed Jul. 20, 2006, now abandoned. Priority benefit is hereby claimed to each of the prior non-provisional patent applications U.S. application Ser. Nos. 11/810,063 and 11/490,361, and each is hereby incorporated by reference in its entirety for all purposes.

BACKGROUND

1. Technical Field

The present disclosure relates to assemblies and methods for mounting a patch panel rack to a cable pathway in a telecommunication data center.

2. Background Art

Modern buildings, particularly commercial buildings, require an effective and efficient telecommunications infrastructure to support the wide variety of services that rely on the electronic transport of information. Typically, wiring systems within buildings are terminated in a central wiring closet where they may be interconnected with one another, and/or to other cabling systems or telecommunications equipment. Cables are often terminated on wire panels (such as RJ-45 patch panels) or the like, which are mounted either to racks, or to stand-off brackets affixed to a wall.

Patch panels are well known in the field of data communication systems. A patch panel generally provides a plurality of network ports incorporated into a single structural element that connect incoming and outgoing lines of a local area network (LAN) or other communication, electronic or electrical system. Patch panels are usually housed within a telecommunications closet or in an alternative location appropriate for patching cables. Typical patch panels are mounted hardware units that include a plurality of port locations (e.g., twenty four or forty eight) that function as a sort of static switchboard, using cables to interconnect computers associated with a LAN and/or to connect computers to an outside network, e.g., for connection to the Internet or other wide area network (WAN). A patch panel generally uses a sort of jumper cable, called a patch cord, to create each interconnection.

In a typical installation, the patch panel connects a network's computers to each other and to the outside lines that enable the LAN to connect to the Internet or another WAN. Connections are generally made with patch cords and the patch panel allows circuits to be easily and efficiently arranged and rearranged by plugging and unplugging the patch cords. Patch panel systems are generally intended to facilitate organization and management in implementing telecommunications wiring systems, e.g., for high speed data networks.

Patch panels are routinely mounted between rack elements so as to permit wires or cables, e.g., unshielded twisted pair (UTP) cables, to be wired to IDCs positioned at the rear face of the patch panel, and to further permit patch plugs to be plugged into jacks or ports positioned in the front face of the patch panel. Wires/cables are routed to the desired location at the rear of the patch panel, i.e., in the bounded region defined by spaced rack elements. Patch cords are routed to the desired jack/port on the front face of the patch panel, e.g., from a raceway or the like. Thus, for cable management purposes, the patch cords are generally drawn toward one or the other side of the patch panel at the front of the rack system and, from there, routed to the desired component and/or network communication location.

Stand-off brackets typically consist of metal forms with a back panel (which may be affixed to a wall or a rack) and side walls extending from the back panel. The back panel may include a hole through which wires are leaded for connection to a wire panel attached across the side walls. Patch panels affixed to a rack and/or a telecommunications closet affords convenient access to telecommunication devices such as servers, for example, within the same rack or closet.

As the demand for the use of telecommunication devices rapidly grows, space for such devices becomes both limited and expensive. Although in some environments, patch panels are affixed to a rack, closet, and/or cabinet along with the respective devices, such as servers, the demand for space has created a need to place the patch panels in a separate location. Typically, if space is needed for more servers, for example, patch panels are mounted on a wall within a data center.

Many rows of cabinets or racks typically fill a data center or telecommunications room. Data cables from each cabinet stretch many feet to reach patch panels mounted on a far wall making immediate access more difficult and inconvenient than having the patch panels in closer proximity. Removing the patch panels from the cabinets saves cost by creating more space for servers, however, additional burdens exist as a result. Mounting patch panels on a wall requires lengthy and costly cables to stretch across burdensome lengths. Moreover, TIA/EIA requirements place cable length limitations for certain types of data cables, such as Cat 5 or 6. This in turn requires burdensome planning, organizing and cost in order to be compliant with industry requirements.

Accordingly, a need exists for mounting a patch panel in a convenient location that allows for advantageous cable management within a data center. These and other disadvantages and/or limitations are addressed and/or overcome by the assemblies and methods of the present disclosure.

SUMMARY

The present disclosure provides for assemblies and methods for mounting a plurality of ports with respect to a wire cable management pathway to facilitate more efficient access to the ports from a telecommunications closet. In an exemplary embodiment, the present disclosure provides for a patch panel rack including a front face, an opening formed in the front face configured and dimensioned to receive and accommodate for mounting with respect to the patch panel rack at least one patch panel, wherein the improvement comprises a waterfall member connected to the front face of the patch panel rack, the waterfall member including a horizontally extending surface positioned in front of the front face just below the opening formed therein, and at least one curved drop-off portion positioned adjacent the horizontally extending surface and sized, shaped, oriented, and configured to permit electrical cables extending vertically upward from electrical equipment disposed beneath the waterfall member to the patch panel mounted above the waterfall member to maintain a desired bend radius.

The waterfall member may be detachably connected to the front face of the patch panel rack. For example, the waterfall member may be selectively interchangeable to allow a user to interchange the waterfall member according to a desired bend radius or an appropriate size. Alternatively, the patch panel rack and the waterfall member may be molded or manufactured as a single component.

The patch panel rack may define a plurality of apertures configured and dimensioned to permit the patch panel rack to be mounted onto at least one mounting bracket. The plurality of apertures may be configured and dimensioned to permit the patch panel rack to be mounted onto respective first and second mounting brackets disposed behind the front face at opposite horizontal ends of the patch panel rack. The plurality of apertures may be substantially vertically aligned to permit the patch panel rack to be adjustably mounted to the at least one mounting bracket, including affording a user the ability to adjust the height or position of the patch panel rack to accommodate for varying environments.

The waterfall member may include opposite horizontal ends, and the waterfall member including at least one curved drop-off portion may include wherein each horizontal end of the opposite horizontal ends of the waterfall member defines a respective curved drop-off portion.

The waterfall member may include opposite horizontal ends, and an intermediate opening may be formed in the horizontally extending surface of the waterfall member intermediate the opposite horizontal ends of the waterfall member and configured and dimensioned to permit electrical cables extending vertically upward from electrical equipment disposed beneath the waterfall member to the patch panel mounted above the waterfall member to pass through the horizontally extending surface of the waterfall member. In accordance with at least some such embodiments, as well as other embodiments, the waterfall member including at least one curved drop-off portion includes wherein the waterfall member defines at least one curved drop-off portion adjacent the intermediate opening. In accordance with at least some such embodiments, as well as other embodiments, the intermediate opening may include opposite horizontal ends, and the waterfall member including at least one curved drop off portion adjacent the intermediate opening may include wherein the waterfall member defines a respective curved drop-off portion adjacent each horizontal end of the opposite horizontal ends of the intermediate opening.

In another exemplary embodiment, a combination is provided, the combination including a patch panel rack assembly comprising: a) a patch panel rack including a front face, an opening formed in the front face configured and dimensioned to receive and accommodate for mounting with respect to the patch panel rack at least one patch panel, and a waterfall member including a horizontally extending surface positioned in front of the front face just below the opening formed therein, and at least one curved drop-off portion positioned adjacent the horizontally extending surface and sized, shaped, oriented, and configured to permit electrical cables extending vertically upward from electrical equipment disposed beneath the waterfall member to the patch panel mounted above the waterfall member to maintain a desired bend radius, and b) at least two pathway mounting brackets operable to hold the patch panel rack, the patch panel rack being mounted onto the at least two pathway mounting brackets. The combination further includes a cable management pathway selected from the group consisting of a ladder rack, a wire raceway, and a combination thereof. The cable management pathway extends horizontally within a room including a telecommunications cabinet configured to receive and accommodate electrical equipment, and the at least two pathway mounting brackets are mounted onto the cable management pathway where the cable management pathway is positioned substantially above the telecommunications cabinet.

Each of the mounting brackets may define: (i) a plurality of apertures on a front side of each of the mounting brackets adapted to accept front side bolts to engage said patch panel rack, and (ii) a plurality of apertures on a rear side of each of the mounting brackets adapted to accept rear side bolts to be mounted onto the cable management pathway. The plurality of apertures on the front side of each of the mounting brackets may be substantially vertically aligned, and the plurality of apertures on the rear side of each of the mounting brackets may be substantially vertically aligned. The front side bolts may be screws threadedly connected to the plurality of apertures on the front sides of the mounting brackets. The rear side bolts may be U-bolts adapted to: (i) mount each of the mounting brackets to the cable management pathway, and (ii) engage a double nut adapted to structurally secure each of the mounting brackets to the pathway. The plurality of apertures on the front side of each of the mounting brackets may allow for adjustably mounting the patch panel rack onto each of the mounting brackets. The plurality of apertures on the rear side of each of the mounting brackets may allow for adjustably mounting the mounting brackets onto the cable management pathway. Each of the apertures of the plurality of apertures on the rear side of each of the mounting brackets may comprise a substantially horizontal slot.

Each of the mounting brackets may define: (i) a substantially vertical slot on a front side of each of the mounting brackets adapted to accept a bolt to adjustably mount the patch panel rack onto each of the mounting brackets, and (ii) a substantially vertical slot on a rear side of each of the mounting brackets adapted to accept a bolt to adjustably mount each of the mounting brackets onto the cable management pathway.

The mounting brackets may be side mounted onto the cable management pathway. The mounting brackets may support the weight of the patch panel rack and any ports hosted on the patch panel rack, and the cable management pathway may support the weight of the mounting brackets, the patch panel rack, and any ports hosted on the patch panel rack.

In another exemplary embodiment, a method for accessing a port from a telecommunications cabinet is provided. The method comprises: a) mounting a patch panel rack onto at least two mounting brackets, the patch panel rack being adapted to host a plurality of ports; b) mounting the mounting brackets onto a cable management pathway, wherein the cable management pathway is selected from the group consisting of a ladder rack, a wire raceway, and combination thereof, and further wherein the cable management pathway extends horizontally within a room containing a telecommunications cabinet; and c) employing a waterfall member connected to a front face of the patch panel rack to allow for cables electrically connected to devices associated with the telecommunications cabinet and passing vertically upward therefrom toward the patch panel rack to: (i) connect to the ports, and (ii) maintain a desired bend radius. The mounting brackets may be side mounted onto the cable management pathway. The mounting brackets may support the weight of the patch panel rack and any ports hosted on the patch panel rack, and the cable management pathway may support the weight of the mounting brackets, the patch panel rack, and any ports hosted on the patch panel rack.

Additional features, functions and benefits of the disclosed devices, combinations, assemblies and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein:

FIGS. 2(a)-2(f) are schematics illustrating exemplary embodiments of mounted assemblies associated with the present disclosure;

FIGS. 3(a)-3(c) are schematics illustrating a front face view of exemplary embodiments of an assembly associated with the present disclosure mounted at different positions with respect to the pathway;

DESCRIPTION OF EXEMPLARY EMBODIMENT(S)

Assemblies and methods are disclosed that are effective in efficiently managing cables in a data center or telecommunications closet connecting to a plurality of ports typically associated with a patch panel.

Figure 1:
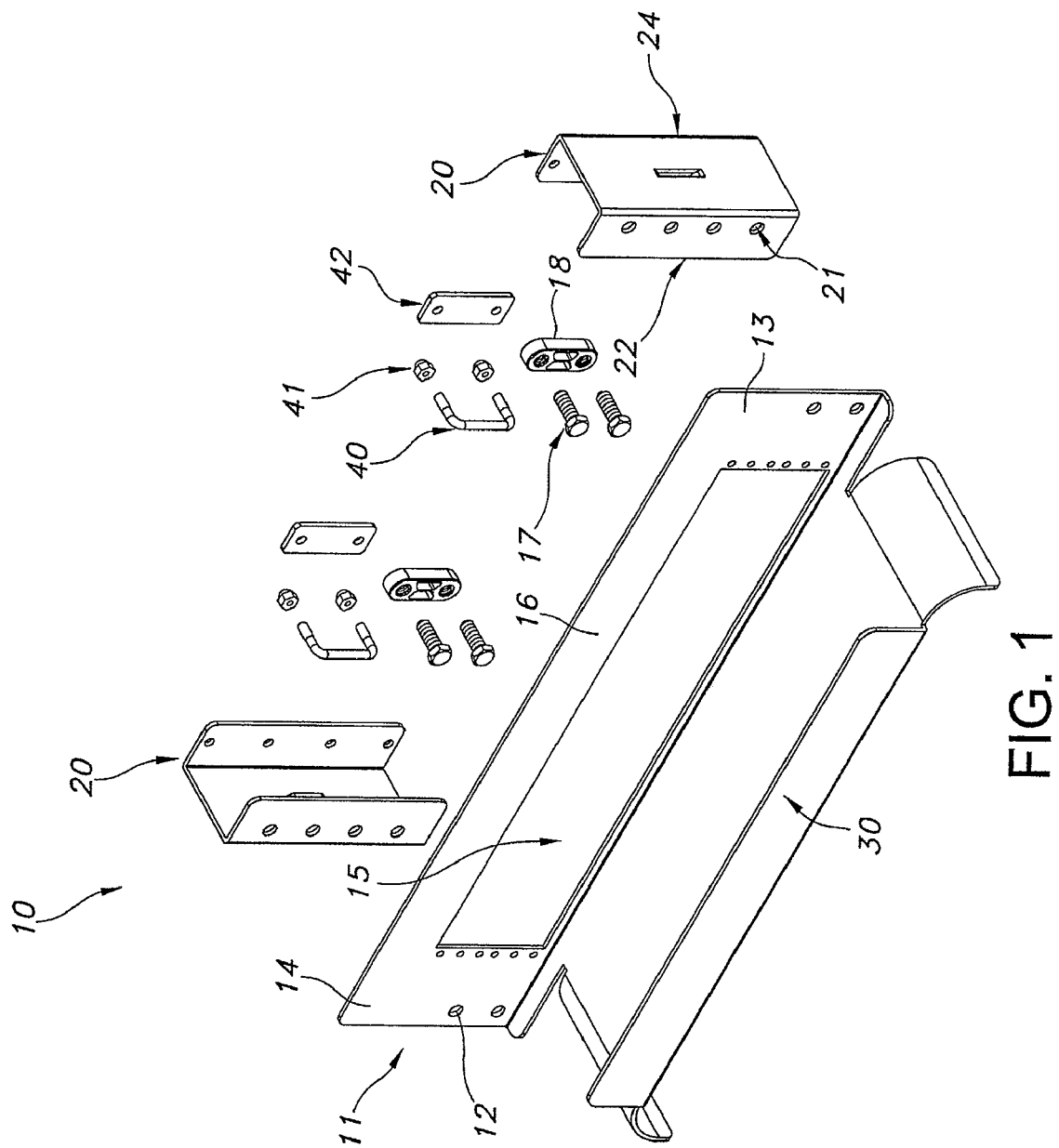
FIG. 1 is a schematic illustrating an exploded view of an assembly associated with the present disclosure.

FIG. 1 is a schematic illustrating an exploded view of an assembly associated with the present disclosure. FIG. 1 is exploded to illustrate individual components of an assembly 10. Assembly 10 includes patch panel rack 11 adapted to host a plurality of ports. Typically, ports are included in a patch panel. An exemplary patch panel rack 11 is adapted to host a plurality of patch panels. In an exemplary embodiment, typically patch panel rack 11 is adapted to host either angled patch panels or flat patch panels within an opening 15. Rack 11 typically defines a plurality of apertures 12 and is adapted to be mounted onto at least one mounting bracket 20. In an exemplary embodiment, assembly 10 includes two mounting brackets 20, each defining a plurality of apertures 21 on both a front side 22 of each of mounting brackets 20 and a rear side 24 of each of mounting brackets 20. In an exemplary embodiment, rack 11 defines two apertures 12, substantially vertically aligned on each of a first end 13 and a second end 14 of front face 16 of patch panel rack 11.

Apertures 12 are adapted to align with apertures 21 such that rack 11 can be adjustably mounted to brackets 20. In an exemplary embodiment, brackets 20 each define four apertures 21 substantially vertically aligned on both front side 22 and rear side 24. Typically, threaded screws 17 connect rack 11 to brackets 20 through apertures 12 and apertures 21 on front side 22 and mate with a double nut 18 structurally securing assembly 10. In an exemplary embodiment, bolts and/or locking pins can be used as a connecting means for mounting rack 11 to brackets 20. Having a plurality of apertures on mounting bracket 20 allows for a user to conveniently adjust rack 11 vertically on brackets 20. Adjustably mounting rack 11 to brackets 20 affords a user to adjust the height and/or position of assembly 10 to accommodate for varying environments.

In an exemplary embodiment, brackets 20 and rack 11 can define an elongated slot. The elongated slot (not shown) is typically substantially vertical and adapted to allow a connecting means to provide structural stability to assembly 10. An elongated slot is adapted to allow for adjustably mounting rack 11 to brackets 20. This allows for advantageous compatibility for mounting assembly 10 in various environments.

Assembly 10 includes a waterfall 30 adapted to allow cables to connect to a patch panel mounted on patch panel rack 11 while maintaining a desired bend radius. Waterfall 30 is connected to patch panel rack 11 on a front face 16 of patch panel rack 11 just below opening 15. In an exemplary embodiment, waterfall 30 can be detachably connected to rack 11. Detachably connecting waterfall 30 allows a user to interchange the waterfall according to a desired bend radius and/or appropriate size. An exemplary assembly associated with the present disclosure includes a patch panel rack 11 having waterfall 30 molded and/or manufactured as a single component.

In an exemplary embodiment, rear side 24 of each of brackets 20 typically define four apertures 21, vertically aligned, adapted to accept a connecting means and be mounted onto a cable management pathway providing structural stability. Connecting means associated with the present disclosure are rear side bolts. In an exemplary embodiment, rear side bolts are typically U bolts 40 adapted to engage brackets 20 through apertures 21 and connect to a pathway. U bolts 40 are then secured by nuts 41. Optional spacers 42 can be used to secure brackets 20 to a desired pathway. Spacers 42 ensure a tight fit when mounting assembly 10 to a pathway and also allows for interchanging assembly 10 among different pathways. In an exemplary embodiment, assembly 10 is detachably mounted onto a raceway, thus allowing a user to move and/or adjust assembly 10 to accommodate given space constraints.

In exemplary embodiments, as shown in FIGS. 2(a)-2(f) assembly 10 is adjustably mounted to a pathway to allow maneuverability with respect to varying spatial constraints. A cable management pathway is typically a wire raceway 201 or a ladder rack 202. Wire raceways are also commonly known as wire basket trays, wire cable trays, and/or a basket. Pathways are also commonly referred to as runways or raceways. These terms are interchangeable and in no way limit the scope of the present disclosure with reference to one specific nomenclature.

FIGS. 2(a), 2(c), and 2(e) illustrate exemplary embodiments with respect to the present disclosure wherein assembly 10 is mounted to wire raceway 201. FIGS. 2(b), 2(d), and 2(f) illustrate exemplary embodiments with respect to the present disclosure wherein assembly 10 is mounted to ladder rack 202. FIG. 2(a) illustrates an exemplary embodiment of assembly 10 side mounted onto raceway 201 such that rack 11 is substantially parallel with raceway 201. Rack 11 is mounted to each of brackets 20 through the bottom two apertures 21 of front side 22. Brackets 20 are mounted to raceway 201 through the top two apertures 21 of rear side 24. FIG. 2(b) illustrates mounting assembly 10 in a substantially similar manner to FIG. 2(a) with respect to selected apertures 21, however, assembly 10 is mounted onto ladder rack 202 rather than raceway 201.

FIG. 2(c) illustrates an exemplary embodiment associated with the present disclosure of assembly 10 mounted to a wire raceway, such that rack 11 is slightly above raceway 201. FIG. 2(c) shows mounting rack 11 to brackets 20 through the bottom two apertures 21 of front side 22 and mounting brackets 20 to raceway 201 through the bottom two apertures 21 of rear side 24. FIG. 2(d) illustrates mounting assembly 10 in a substantially similar manner to FIG. 2(c) with respect to selected apertures 21, however, assembly 10 is mounted onto ladder rack 202 rather than raceway 201.

FIG. 2(e) illustrates an exemplary embodiment associated with the present disclosure of assembly 10 mounted to a wire raceway, such that rack 11 is located substantially above raceway 201. FIG. 2(e) shows mounting rack 11 to brackets 20 through the top two apertures 21 of front side 22 and mounting brackets 20 to raceway 201 through the bottom two apertures 21 of rear side 24. FIG. 2(f) illustrates mounting assembly 10 in a substantially similar manner to FIG. 2(e) with respect to selected apertures 21, however, assembly 10 is mounted onto ladder rack 202 rather than raceway 201.

FIGS. 3(a)-3(c) illustrate front side views of the embodiments described and illustrated in FIGS. 2(a)-2(f). FIG. 3(a) shows a front side view of assembly 10 mounted to either of raceway 201 or ladder rack 202. FIG. 3(b) shows a front side view of assembly 10 mounted to either of raceway 201 or ladder rack 202. FIG. 3(c) shows a front side view of assembly 10 mounted to either of raceway 201 or ladder rack 202.

Figure 4:
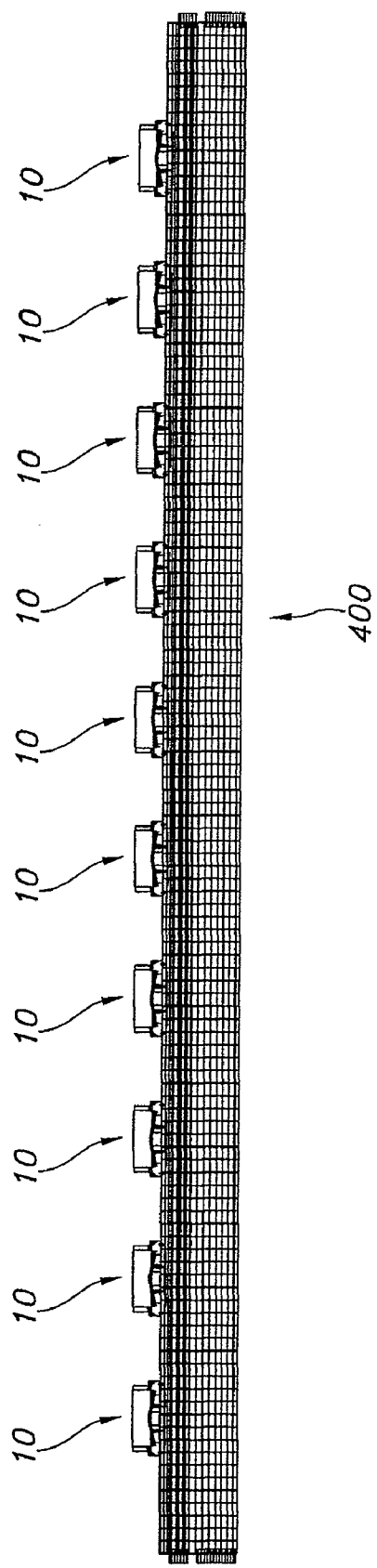
FIG. 4 is a schematic illustrating a front face view of a plurality of assemblies associated with the present disclosure mounted onto a wire raceway.

A typical data center will have several rows of telecommunications cabinets and/or closets substantially aligned in a room such as a data center. Typically hanging over the closets are cable management pathways adapted to allow for many cables to connect to designated ports and/or destinations in different areas of the room and/or leading outside the room. FIG. 4 illustrates a top view of an exemplary embodiment associated with the present disclosure of a typical wire raceway 400 having a plurality of assemblies 10 mounted therein. Raceway 400 is typically located above a row of telecommunications cabinets (not shown). Mounting an assembly 10 above each telecommunications cabinet allows for desired patch panel access within advantageous proximity and substantially reducing cable quantity. Moreover, mounting patch panels above a cabinet rather than occupying a rack space within the cabinet allows for more servers and/or desired devices to fit within the cabinet, thus saving cost on space limitations.

In an embodiment associated with the present disclosure, assemblies 10 are mounted to raceway 400 such that at least one of the plurality of assemblies 10 are not parallel with at least one other of the plurality of assemblies 10. Each assembly can be positioned at a different height relative to the other assemblies in order to accommodate for spatial constraints of a given room.

Figure 5:
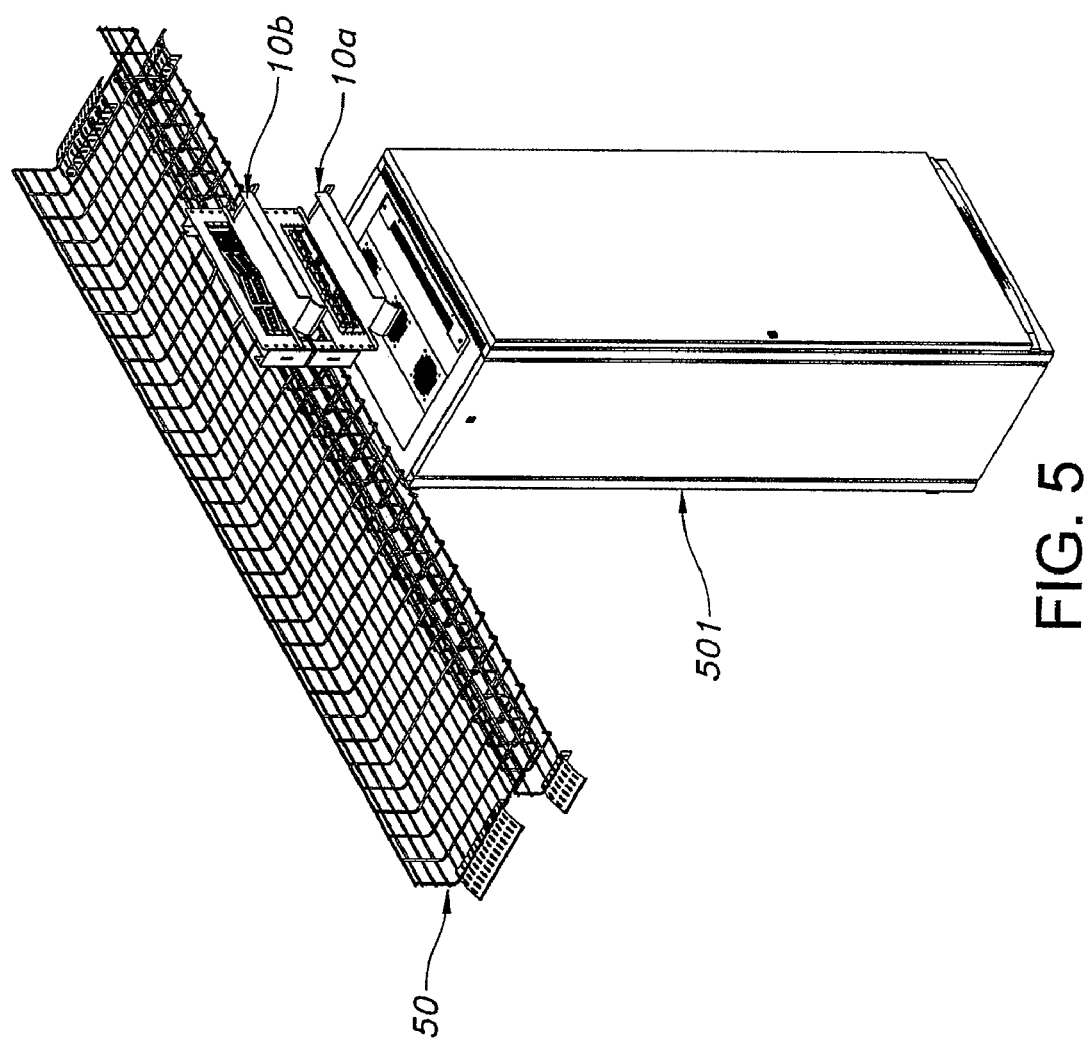
FIG. 5 is a schematic illustrating multiple assemblies associated with the present disclosure side mounted on a wire raceway overhead a telecommunications cabinet.

FIG. 5 illustrates an exemplary multi-level assembly embodiment. Raceway 500 runs overhead relative to telecommunications cabinet 501. Assemblies 10(a) and 10(b) are mounted onto raceway 500 according to the present disclosure described herein. Assemblies 10(b) is mounted substantially vertically aligned to assembly 10(a) directly overhead relative to cabinet 501. The embodiment shown in FIG. 5 allows devices associated cabinet 501 to have proximate electrical access to multiple patch panels. However, patch panel access associated with assemblies 10(a) and 10(b) is not limited to cabinet 501. In an exemplary embodiment, cabinets adjacent with respect to cabinet 501 may have access and electronically connect to assemblies 10(a) and/or 10(b).

Figure 6:
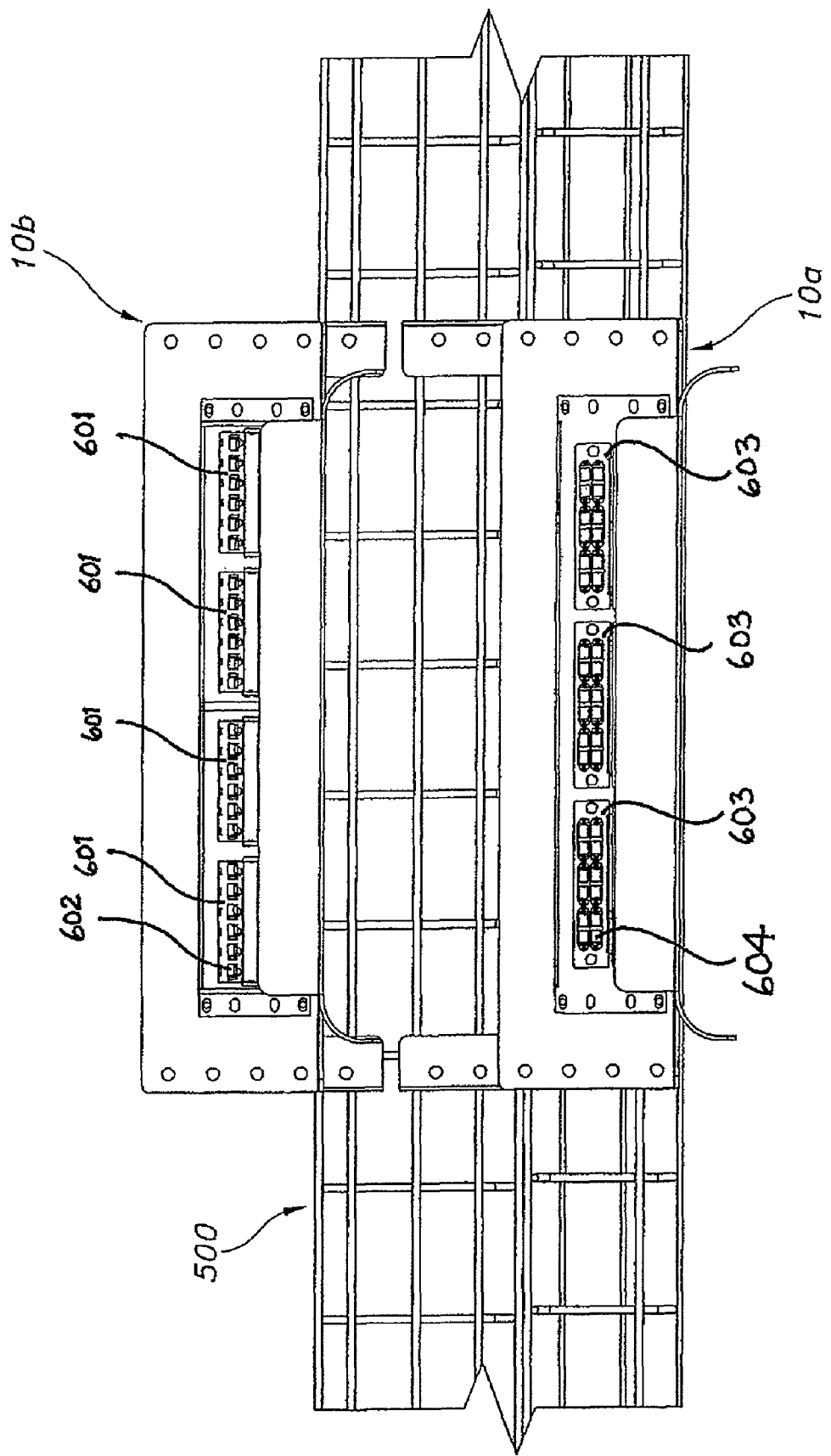
FIG. 6 is a schematic illustrating a front face view of a multi-assembly embodiment side mounted on a wire raceway.
Figure 7:
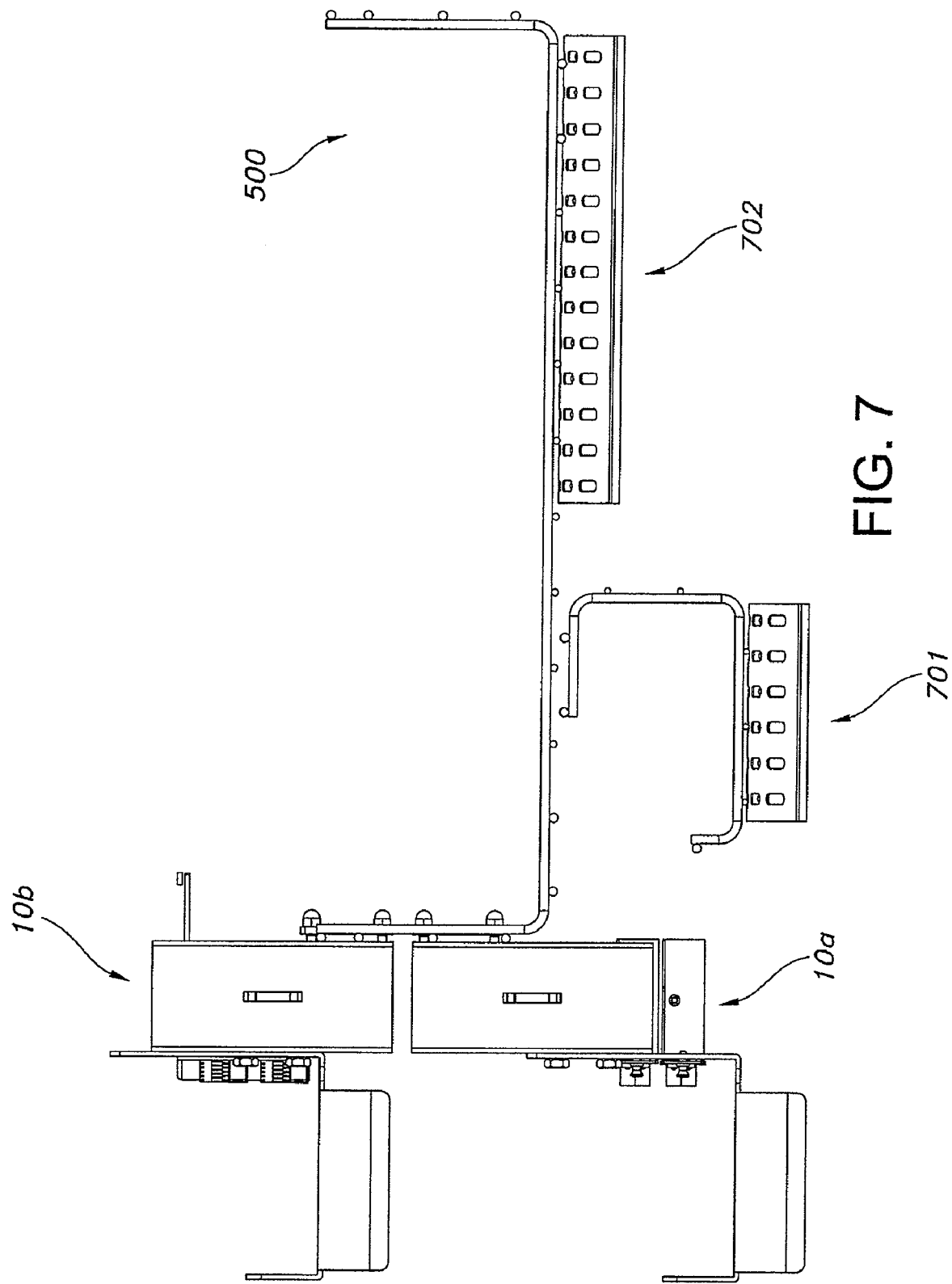
FIG. 7 is a schematic illustrating a side view of a multi-assembly embodiment side mounted on a wire raceway.

FIG. 6 illustrates a front face view of the exemplary embodiment of FIG. 5 showing exemplary mounting positions of assemblies 10(a) and 10(b) relative to raceway 500. FIG. 7 illustrates a cross sectional view of the exemplary embodiments of FIG. 5 showing functional structures associated with raceway 500. An exemplary embodiment of raceway 500 includes a cable exit guide 701 and a cable dropout 702. Guide 701 and dropout 702 provide for cables running along raceway 500 to selectively connect to desired destinations including, for example, patch panels associated with assemblies 10(a) and 10(b).

Figure 8A:
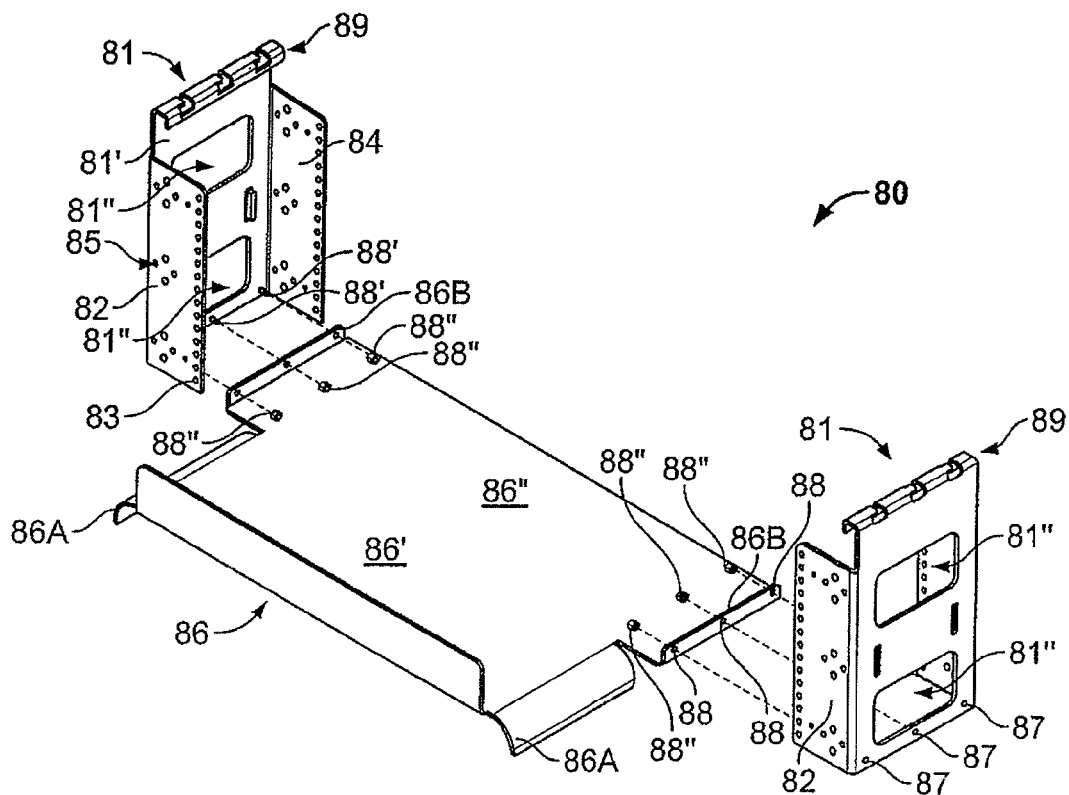
FIG. 8A is a perspective exploded view of an exemplary assembly with a waterfall base associated with the present disclosure.
Figure 8B:
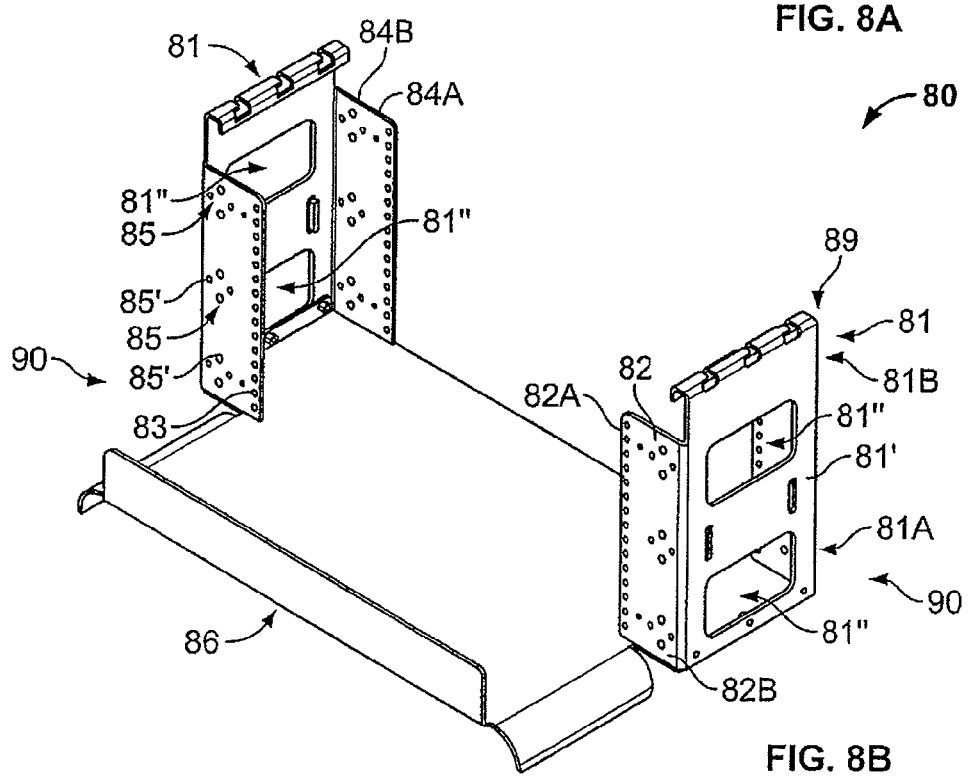
FIG. 8B is an assembled perspective view of the assembly illustrated with respect to FIG. 8A.
Figure 9A:
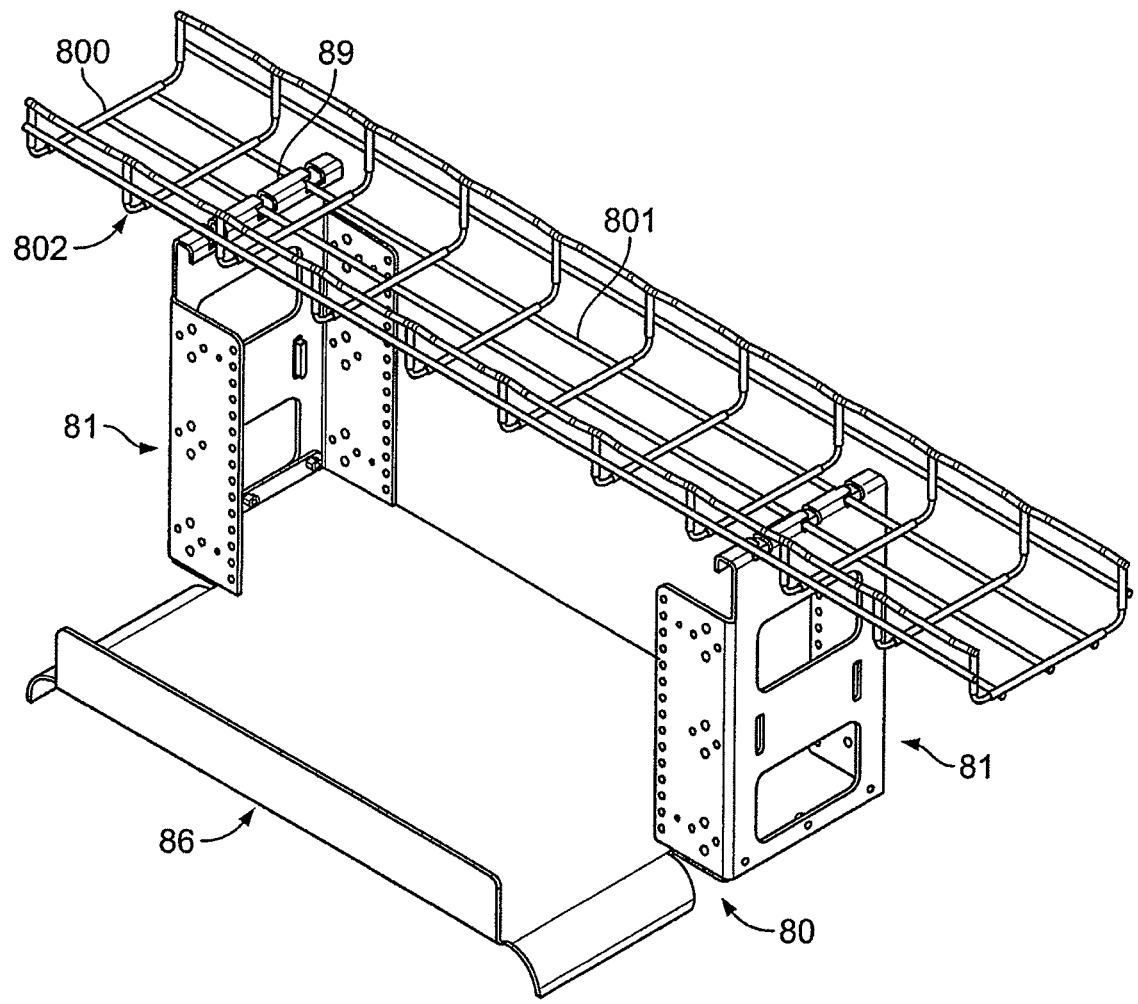
FIG. 9A illustrates the assembly with respect to FIG. 8B mounted with respect to a wire cable management pathway.
Figure 9B:
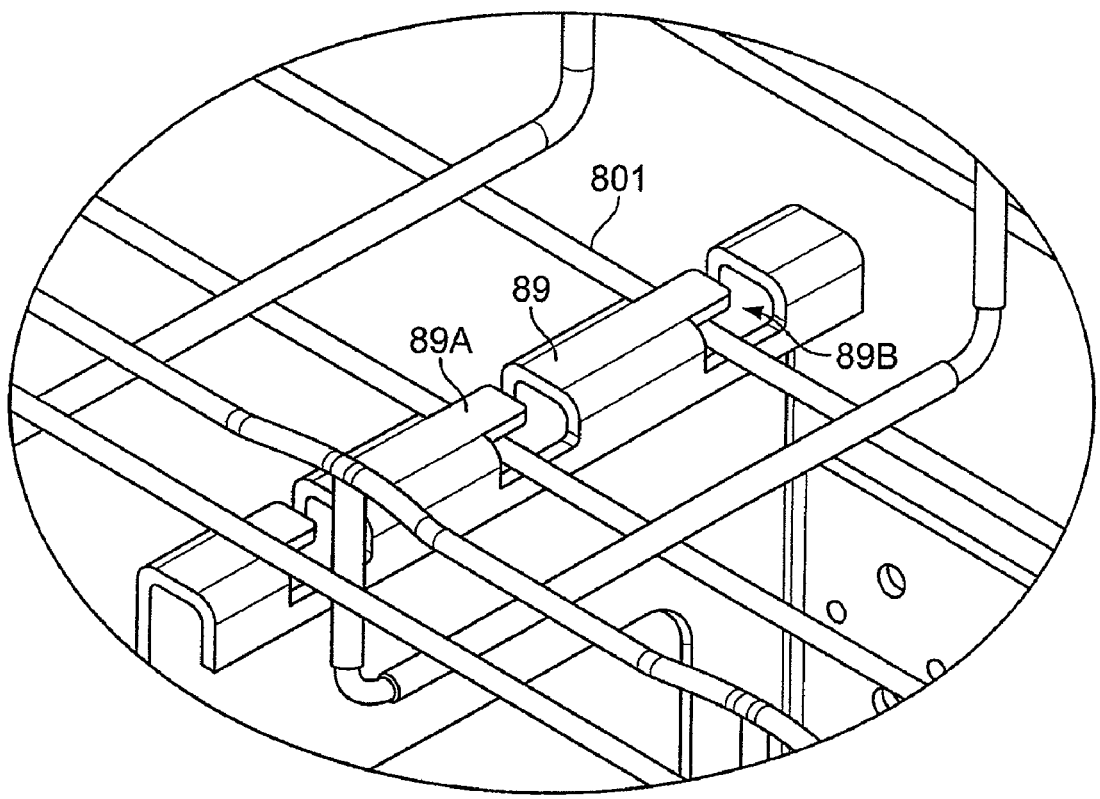
FIG. 9B illustrates an enlarged view of the mounting interaction associated with mounting of the brackets with respect to the wire cable management pathway with respect to FIG. 9A.

With reference to FIGS. 8A, 8B, 9A and 9B, an exemplary wire cable management pathway mounting assembly 80 is shown. FIGS. 8A and 8B illustrate an exploded and assembled view of an exemplary assembly 80 respectively. FIG. 9A illustrates an exemplary assembly 80 mounted with respect to an exemplary wire cable management pathway 800. As shown in FIG. 9A, when mounting assembly 80 with respect to an underneath portion 802 of pathway 800, assembly 80 is substantially hanging and/or supported by pathway 800. FIG. 9B illustrates an enlarged view of a portion of a cable management pathway mounting feature 89 of an exemplary assembly 80 associated with the present disclosure.

Exemplary assembly 80 includes a pair of mounting brackets 81. It is understood that mounted brackets 81 can also be referred to as uprights distinguished as right and left uprights with respect to an exemplary waterfall base 86. Mounting brackets 81 are typically spaced apart to allow for mounting of a waterfall base 86. Waterfall base 86 includes a front portion 86' integrally formed with a rear portion 86". Front portion 86' defines a substantially flat surface having a curved drop-off portion 86A on each horizontal end 90. Front portion 86' defines a substantially waterfall geometry similar to waterfall 30 as described with respect to FIG. 1. The waterfall geometry associated with 86' is shaped and sized to maintain an appropriate bend radius for effective cable management.

Rear portion 86" defines a substantially flat surface extending rearwardly with respect to front portion 86'. Rear portion 86" includes a mounting flange 86B at each horizontal end 90. Typically, mounting flanges 86B extend vertically with respect to rear portion 86" and define at least one flange aperture 88. In an exemplary, each of flanges 86B define a plurality of flange apertures 88. In a further exemplary embodiment, flanges 86B define three flange apertures 88. Each flange aperture 88 is adapted to receive a securing feature 88'. Each securing feature 88' is adapted to pass through a flange aperture 88 and secure waterfall base 86 with respect to brackets 81. Securing features 88' can be any member selected from the group consisting of a screw, bolt, nail and combinations thereof. In an exemplary embodiment, securing feature 88' is a screw.

In an exemplary embodiment, waterfall base 86 is secured and/or mounted with respect to brackets 81 by way of passing a securing feature 88' through a flange aperture 88 and a support aperture 87 defined on a bottom portion 81A associated with support surface 81', and engaging with a lock nut 88". Each securing feature 88' engages with at least one lock nut 88" to effectively secure waterfall base 86 with respect to brackets 81.

Each bracket 81 includes support surface 81' defining a bottom portion 81A and a top portion 81B. Bottom portion 81A defines at least one support aperture 87. In an exemplary embodiment, bottom portion 81A defines a plurality of support apertures 87. In a further exemplary embodiment, bottom portion 81A defines three support apertures 87. Each support aperture 87 is adapted to receive a securing feature 88'. Securing feature 88' is adapted to further pass through support aperture 87 and engage with a lock nut 88" thereby securing waterfall base 86 with respect to brackets 81. Once assembled, each bracket 81 is positioned on opposite horizontal ends 90 of assembly 80 as illustrated with respect to FIGS. 8A and 8B.

Top portion 81B of support surface 81' includes at least one upwardly extending wire cable management pathway mounting feature 89 adapted to securely mount the pair of mounting brackets 81 with respect to a wire cable management pathway 800. In an exemplary embodiment, cable management pathway mounting feature 89 is a mounting clip feature 89. In an exemplary embodiment, top portion 81B includes a plurality of mounting clip features 89. Each mounting clip feature 89 can be integrally formed with respect to top portion 81B. Each mounting clip feature 89 extends upwardly with respect to top portion 81B and defines a substantially curved portion (also referred to as a bent over portion) adapted to securely mount bracket 81 with respect to a wire cable management pathway 800. In an exemplary embodiment, the curved portion of mounting clip feature 89 curves substantially inward with respect to waterfall base 86 substantially defining an upside down U-shape geometry. In an exemplary embodiment, wire cable management pathway 800 is a wire raceway adapted to allow cables associated with an exemplary telecommunications environment to extend across significant distances in an orderly fashion.

In an exemplary embodiment, each mounting clip feature 89 includes a fold over tab 89A. Tab 89A extends horizontally with respect to clip feature 89 thereby defining a gap opening 89B for receiving an individual wire 801 associated with pathway 800. Once each gap opening 89B associated with bracket 81 has received an individual wire 801, fold over tab 89A can be manipulated to substantially fold over wire 801 thereby securely mounting bracket 81 with respect to pathway 800. In an exemplary embodiment, a screw driver can be effective in appropriately securing fold over tab 89A with respect to individual wire 801. As illustrated in FIG. 5, in an exemplary embodiment, a cable management pathway, such as pathway 50 associated with FIG. 5 or pathway 800 associated with FIGS. 9A and 9B, is positioned substantially above an exemplary telecommunications closet, such as closet 501 associated with FIG. 5. Exemplary assembly 80 associated with the present disclosure allows for mounting of patch panels substantially underneath an exemplary pathway 800.

Each bracket 81 includes a front side surface 82 and an oppositely positioned rear side surface 84. Front side surface 82 and rear side surface 84 extend inwardly towards an oppositely positioned bracket 81 in a substantially perpendicular relationship with respect to support surface 81'. In an exemplary embodiment, front side surface 82 and rear side surface 84 are substantially aligned and parallel with respect to each other. Accordingly, each of front side surface 82 and rear side surface 84 define a plurality of patch panel mounting apertures 83. Typically, apertures 83 are substantially vertically aligned along each of front side surface 82 and rear side surface 84. Each of front side surface 82 and rear side surface 84 defines an inner portion 82A and 84A respectively and an outer portion 82B and 84B respectively. In an exemplary embodiment, apertures 83 are substantially vertically aligned along inner portion 82B and 84B.

Patch panel mounting apertures 83 are adapted to receive securing features (not shown) for mounting a plurality of ports, often hosted on an exemplary patch panel (not shown), with respect to brackets 81. A plurality of apertures 83 allows for several different mounting positions of the patch panel with respect to brackets 81.

In an exemplary embodiment, each of front side surface 82 and rear side surface 84 further define at least one wire management clip aperture set 85. In an further exemplary embodiment, each of front side surface 82 and rear side surface 84 further define a plurality of wire management clip aperture sets 85. Each wire management clip aperture set 85 includes at least one aperture 85' and typically includes a plurality of apertures 85'. In an exemplary embodiment, aperture set 85 includes four apertures 85' arranged in a substantially diamond pattern, often referred to as a four hole pattern. Each aperture set 85 is adapted to allow for mounting of a wire management clip (not shown) with respect to bracket 81. In an exemplary embodiment, three aperture sets 85, arranged in a substantially diamond configuration, are aligned vertically along outer portion 82B of front side surface 82 and outer portion 84B of rear side surface 84.

In an exemplary embodiment, support surface 81' defines a pair of vertically spaced apart openings 81". Openings 81" are adapted to allow for a plurality of cables, associated with an exemplary telecommunications closet, to pass through bracket 81 and facilitate effective and efficient cable management.

Figure 10:
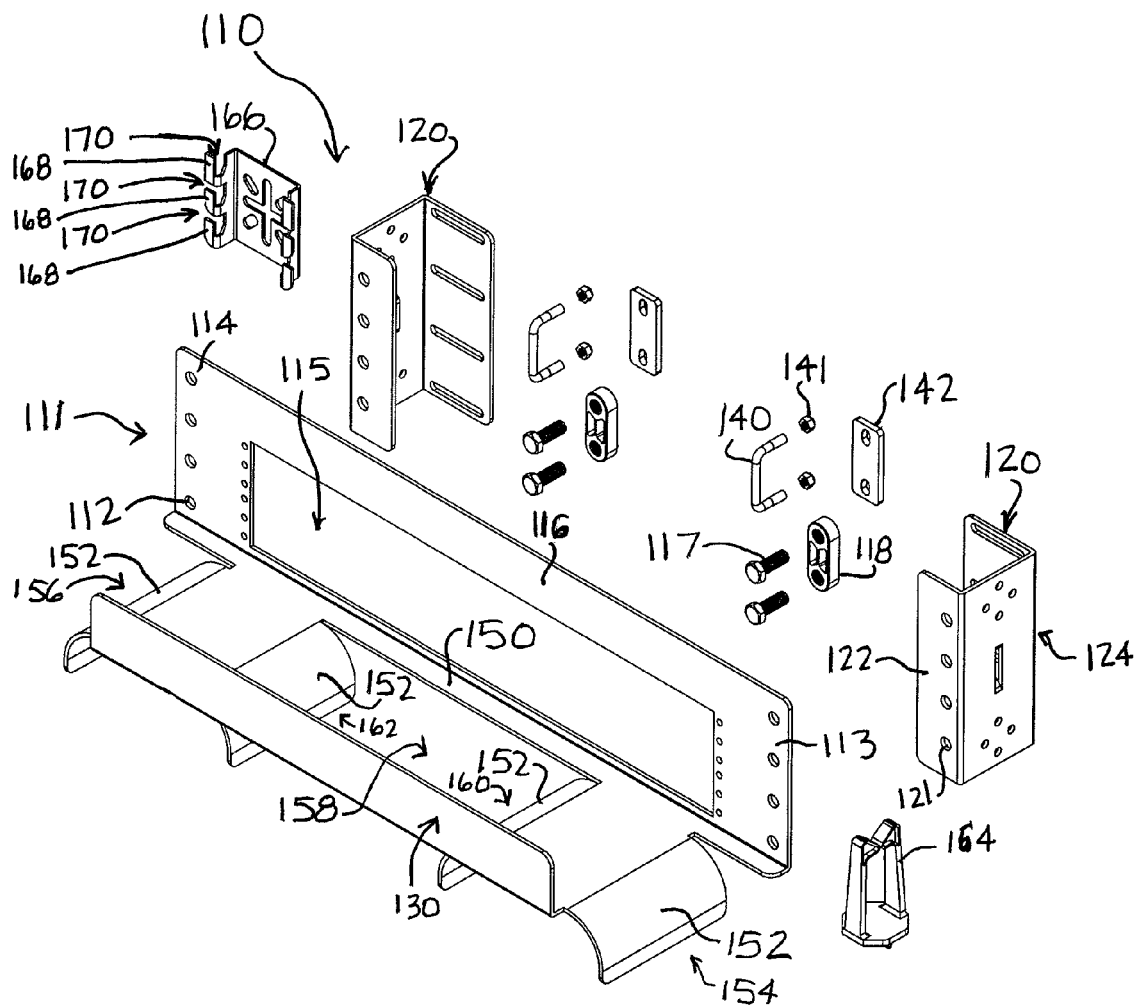
FIG. 10 is a schematic illustrating an exploded view of another assembly associated with the present disclosure.

FIG. 10 is a schematic illustrating an exploded view of another assembly associated with the present disclosure. FIG. 10 is exploded to illustrate individual components of an assembly 110. The assembly 110 may be substantially similar to the assembly 10 described above with reference to FIG. 1, including wherein at least some of the assembly components or features set forth in FIG. 10 that, on image guidance, appear to correspond to certain corresponding assembly components or features set forth in FIG. 1, may in fact exhibit the same or substantially similar structure as that which is exhibited by such certain corresponding assembly components or features set forth in FIG. 1, and/or perform the same or substantially similar functions as those which are performed by such certain corresponding assembly components or features set forth in FIG. 1. Examples of such structural and/or functional similarity between assembly components or features of the assembly 110 which bear such structural and/or functional similarity with assembly components or features of the assembly 10 may include assembly components or features in FIGS. 1 and 10, the reference numerals for which appear the same in the 'units' place and the 'tens' place, and differ only by the presence in FIG. 10 of the numeral 1 in the 'hundreds' place. Both the similarities of, and the differences between, the assembly 110 of FIG. 10 and the assembly 10 of FIG. 1, will now be discussed.

Still referring to FIG. 10, the assembly 110 includes patch panel rack 111 adapted to host a plurality of ports. Typically, ports are included in a patch panel. An exemplary patch panel rack 111 is adapted to host a plurality of patch panels. In an exemplary embodiment, typically patch panel rack 111 is adapted to host either angled patch panels or flat patch panels within an opening 115. Rack 111 typically defines a plurality of apertures 112 and is adapted to be mounted onto at least one mounting bracket 120. In an exemplary embodiment, assembly 110 includes two mounting brackets 120, each defining a plurality of apertures 121 on both a front side 122 of each of mounting brackets 120 and a rear side 124 of each of mounting brackets 120. In an exemplary embodiment, rack 111 defines four apertures 112, substantially vertically aligned on each of a first end 113 and a second end 114 of front face 116 of patch panel rack 111.

Apertures 112 are adapted to align with apertures 121 such that rack 111 can be adjustably mounted to brackets 120. In an exemplary embodiment, brackets 120 each define four apertures 21 substantially vertically aligned on both front side 122 and rear side 124. Typically, threaded screws 117 connect rack 111 to brackets 120 through apertures 112 and apertures 121 on front side 122 and mate with a double nut 118 structurally securing assembly 110. In an exemplary embodiment, bolts and/or locking pins can be used as a connecting means for mounting rack 111 to brackets 120. Having a plurality of apertures on mounting bracket 120 allows for a user to conveniently adjust rack 111 vertically on brackets 120. Adjustably mounting rack 111 to brackets 120 affords a user to adjust the height and/or position of assembly 110 to accommodate for varying environments.

In an exemplary embodiment, brackets 120 and rack 111 can define an elongated slot. The elongated slot (not shown) is typically substantially vertical and adapted to allow a connecting means to provide structural stability to assembly 110. An elongated slot is adapted to allow for adjustably mounting rack 111 to brackets 120. This allows for advantageous compatibility for mounting assembly 110 in various environments.

Assembly 110 includes a waterfall 130 adapted to allow cables to connect to a patch panel mounted on patch panel rack 111 while maintaining a desired bend radius. The waterfall 130 is connected to patch panel rack 111 on a front face 116 of patch panel rack 111 just below opening 115. In an exemplary embodiment, waterfall 130 can be detachably connected to rack 111. Detachably connecting the waterfall 130 allows a user to interchange the waterfall according to a desired bend radius and/or appropriate size. An exemplary assembly associated with the present disclosure includes a patch panel rack 111 having the waterfall 130 molded and/or manufactured as a single component.

In an exemplary embodiment, rear side 124 of each of brackets 120 typically define four apertures 121, vertically aligned, adapted to accept a connecting means and be mounted onto a cable management pathway providing structural stability. Connecting means associated with the present disclosure are rear side bolts. In an exemplary embodiment, rear side bolts are typically U bolts 140 adapted to engage brackets 120 through apertures 121 and connect to a pathway. U bolts 140 are then secured by nuts 141. Optional spacers 142 can be used to secure brackets 120 to a desired pathway. Spacers 142 ensure a tight fit when mounting assembly 110 to a pathway and also allows for interchanging assembly 110 among different pathways. In an exemplary embodiment, assembly 110 is detachably mounted onto a raceway, thus allowing a user to move and/or adjust assembly 110 to accommodate given space constraints.

The waterfall 130 defines a substantially flat surface 150 having a curved drop-off portion 152 on each horizontal end 154, 156 of the waterfall 130. The waterfall 130 defines a substantially waterfall geometry at least partially similar to the waterfall 30 as described with respect to FIG. 1. The waterfall geometry associated with the waterfall 130 is shaped and sized to maintain an appropriate bend radius for effective cable management. In at least some exemplary embodiments, the patch panel rack 111 includes at least one additional instance of a curved drop-off portion 152 disposed between the two instances of a curved drop-off portion 152 on the horizontal ends 154, 156. For example, and as shown in FIG. 10, the substantially flat surface 150 may include an intermediate opening 158 suitable for the passage of cables therethrough, and the patch panel rack 111 may include a curved drop-off portion 152 positioned at each horizontal end 160, 162 of the intermediate opening 158 such that the patch panel rack 111 is equipped with four (4) instances of the curved drop-off portion 152.

Still referring to FIG. 10, the assembly 110 may include one or more instances of a wire management clip 164. The wire management clip 164 may be a 'snap-on' feature attachable to the remaining structure via the side of the mounting brackets 120, at which location the wire management clip 164 may function to manage cables mounting horizontally or vertically on the assembly 110.

The assembly 110 may further include one or more instances of an exemplary wire cable pathway mounting bracket attachment 166. The one or more instances of a wire cable management pathway mounting bracket attachment 166 may be fastened to the mounting brackets 120, at which location the one or more instances of a wire cable management pathway mounting bracket attachment 166 may function to attach the assembly 110 to a wire cable management pathway 800. More particularly, in an exemplary embodiment, each wire cable management pathway mounting bracket attachment 166 may include a plurality of tabs 168, each of which may extend vertically, thereby defining a corresponding gap opening 170 for receiving an individual wire 801 associated with pathway 800 (see, e.g., FIGS. 9A and 9B), thereby securing the assembly 110 to the wire cable management pathway 800 (e.g., in cases in which the tabs 168 extend vertically downward, rather than upward as shown in FIG. 10, the assembly 110 will be secured to the wire cable management pathway 800 at least in part via the force of gravity).

As shown in FIG. 10, the apertures 121 may be horizontally elongated to afford additional flexibility with respect to the longitudinal position of the assembly 110 relative to the cable management pathway (not shown) to which the assembly 110 is mounted.

Although the present disclosure has been described with reference to exemplary embodiments and implementations thereof, the disclosed assemblies and methods are not limited to such exemplary embodiments/implementations. Rather, as will be readily apparent to persons skilled in the art from the description provided herein, the disclosed assemblies and methods are susceptible to modifications, alterations and enhancements without departing from the spirit or scope of the present disclosure. Accordingly, the present disclosure expressly encompasses such modification, alterations and enhancements within the scope thereof.

What is claimed is:

1. A patch panel rack including a front face, an opening formed in the front face configured and dimensioned to receive and accommodate for mounting with respect to the patch panel rack at least one patch panel, wherein the improvement comprises:

a waterfall member connected to the front face of the patch panel rack, the waterfall member including a horizontally extending surface positioned in front of the front face just below the opening formed therein, and at least one first curved drop-off portion positioned adjacent the horizontally extending surface and sized, shaped, oriented, and configured to permit electrical cables extending vertically upward from electrical equipment disposed beneath the waterfall member to the patch panel mounted above the waterfall member to maintain a desired bend radius.

2. A patch panel rack according to claim 1, wherein the waterfall member is detachably connected to the front face of the patch panel rack.

3. A patch panel rack according to claim 2, wherein the waterfall member is selectively interchangeable to allow a user to interchange the waterfall member according to a desired bend radius or an appropriate size.

4. A patch panel rack according to claim 1, wherein the patch panel rack and the waterfall member are molded or manufactured as a single component.

5. A patch panel rack according to claim 1, wherein the patch panel rack defines a plurality of apertures configured and dimensioned to permit the patch panel rack to be mounted onto at least one mounting bracket.

6. A patch panel rack according to claim 5, wherein the plurality of apertures includes a first plurality of apertures and a second plurality of apertures; wherein the at least one mounting bracket includes first and second mounting brackets disposed behind the front face at opposite horizontal ends of the patch panel rack; and wherein the first plurality of apertures is configured and dimensioned to permit the patch panel rack to be mounted onto the first mounting bracket and the second plurality of apertures is configured and dimensioned to permit the patch panel rack to be mounted onto the second mounting bracket.

7. A patch panel rack according to claim 5, wherein the plurality of apertures are substantially vertically aligned to permit the patch panel rack to be adjustably mounted to the at least one mounting bracket, including affording a user the ability to adjust a height or position of the patch panel rack to accommodate for varying environments.

8. A patch panel rack according to claim 1, wherein the waterfall member includes: (i) a second curved drop-off portion, and (ii) opposite horizontal ends, and wherein each horizontal end of the opposite horizontal ends of the waterfall member defines the respective first and second curved drop-off portions.

9. A patch panel rack according to claim 1, wherein the waterfall member includes opposite horizontal ends, and wherein an intermediate opening is formed in the horizontally extending surface of the waterfall member intermediate the opposite horizontal ends of the waterfall member and configured and dimensioned to permit the electrical cables extending vertically upward from electrical equipment disposed beneath the waterfall member to the patch panel mounted above the waterfall member to pass through the horizontally extending surface of the waterfall member.

10. A patch panel rack according to claim 9, wherein the waterfall member defines the at least one first curved drop-off portion adjacent the intermediate opening.

11. A patch panel rack according to claim 10, wherein the waterfall member includes a second curved drop-off portion; wherein the intermediate opening includes opposite horizontal ends, and wherein the waterfall member defines the respective first and second curved drop-off portions adjacent each horizontal end of the opposite horizontal ends of the intermediate opening.

12. In combination:
a patch panel rack assembly, comprising:
 a) a patch panel rack including a front face, an opening formed in the front face configured and dimensioned to receive and accommodate for mounting with respect to the patch panel rack at least one patch panel, and a waterfall member including a horizontally extending surface positioned in front of the front face just below the opening formed therein, and at least one curved drop-off portion positioned adjacent the horizontally extending surface and sized, shaped, oriented, and configured to permit electrical cables extending vertically upward from electrical equipment disposed beneath the waterfall member to the patch panel mounted above the waterfall member to maintain a desired bend radius; and
 b) at least two pathway mounting brackets operable to hold the patch panel rack, the patch panel rack being mounted onto the at least two pathway mounting brackets; and
a cable management pathway selected from the group consisting of a ladder rack, a wire raceway, and a combination thereof, the cable management pathway extending horizontally within a room including a telecommunications cabinet configured to receive and accommodate electrical equipment;
wherein the at least two pathway mounting brackets are mounted onto the cable management pathway where the cable management pathway is positioned substantially above the telecommunications cabinet.

13. A combination in accordance with claim 12, wherein each of the mounting brackets defines: (i) a plurality of apertures on a front side of each of the mounting brackets adapted to accept front side bolts to engage said patch panel rack, and (ii) a plurality of apertures on a rear side of each of the mounting brackets adapted to accept rear side bolts to be mounted onto the cable management pathway.

14. A combination in accordance with claim 13, (i) the plurality of apertures on the front side of each of the mounting brackets are substantially vertically aligned, and (ii) the plurality of apertures on the rear side of each of the mounting brackets are substantially vertically aligned.

15. A combination in accordance with claim 14, wherein the front side bolts are screws threadedly connected to the plurality of apertures on the front sides of the mounting brackets.

16. A combination in accordance with claim 14, wherein the rear side bolts are U-bolts adapted to: (i) mount each of the mounting brackets to the cable management pathway, and (ii) engage a double nut adapted to structurally secure each of the mounting brackets to the pathway.

17. A combination in accordance with claim 14, wherein the plurality of apertures on the front side of each of the mounting brackets allow for adjustably mounting the patch panel rack onto each of the mounting brackets.

18. A combination according to claim 14, wherein the plurality of apertures on the rear side of each of the mounting brackets allow for adjustably mounting the mounting brackets onto the cable management pathway.

19. A combination according to claim 14, wherein each of the apertures of the plurality of apertures on the rear side of each of the mounting brackets comprises a substantially horizontal slot.

20. A combination according to claim 12, wherein each of the mounting brackets defines: (i) a substantially vertical slot on a front side of each of the mounting brackets adapted to accept a bolt to adjustably mount the patch panel rack onto each of the mounting brackets, and (ii) a substantially vertical slot on a rear side of each of the mounting brackets adapted to accept a bolt to adjustably mount each of the mounting brackets onto the cable management pathway.

21. A combination according to claim 12, wherein the mounting brackets are side mounted onto the cable management pathway.

22. A combination according to claim 12, wherein the mounting brackets support the weight of the patch panel rack and ports hosted on the patch panel rack.

23. A combination according to claim 22, wherein the cable management pathway supports the weight of the mounting brackets, the patch panel rack, and the ports hosted on the patch panel rack.

24. A method for accessing a port from a telecommunications cabinet, comprising:
   a) mounting a patch panel rack onto at least two mounting brackets, the patch panel rack being adapted to host a plurality of ports;
   b) mounting the mounting brackets onto a cable management pathway, wherein the cable management pathway is selected from the group consisting of a ladder rack, a wire raceway, and combination thereof, and further wherein the cable management pathway extends horizontally within a room containing a telecommunications cabinet; and
   c) employing a waterfall member connected to a front face of the patch panel rack to allow for cables electrically connected to devices associated with the telecommunications cabinet and passing vertically upward therefrom toward the patch panel rack to: (i) connect to the ports, and (ii) maintain a desired bend radius;
   wherein the front face of the patch panel rack includes an opening formed therein; and wherein the waterfall member includes a horizontally extending surface positioned in front of the front face lust below the opening formed therein, and at least one curved drop-off portion positioned adjacent the horizontally extending surface and sized, shaped, oriented, and configured to permit the cables to connect to the ports and maintain the desired bend radius.

25. A method according to claim 24, wherein the mounting brackets are side mounted onto the cable management pathway.

26. A method according to claim 24, wherein the mounting brackets support the weight of the patch panel rack and any ports hosted on the patch panel rack.

27. A method according to claim 24, wherein the cable management pathway supports the weight of the mounting brackets, the patch panel rack, and the ports hosted on the patch panel rack.

* * * * *